Patented June 24, 1952

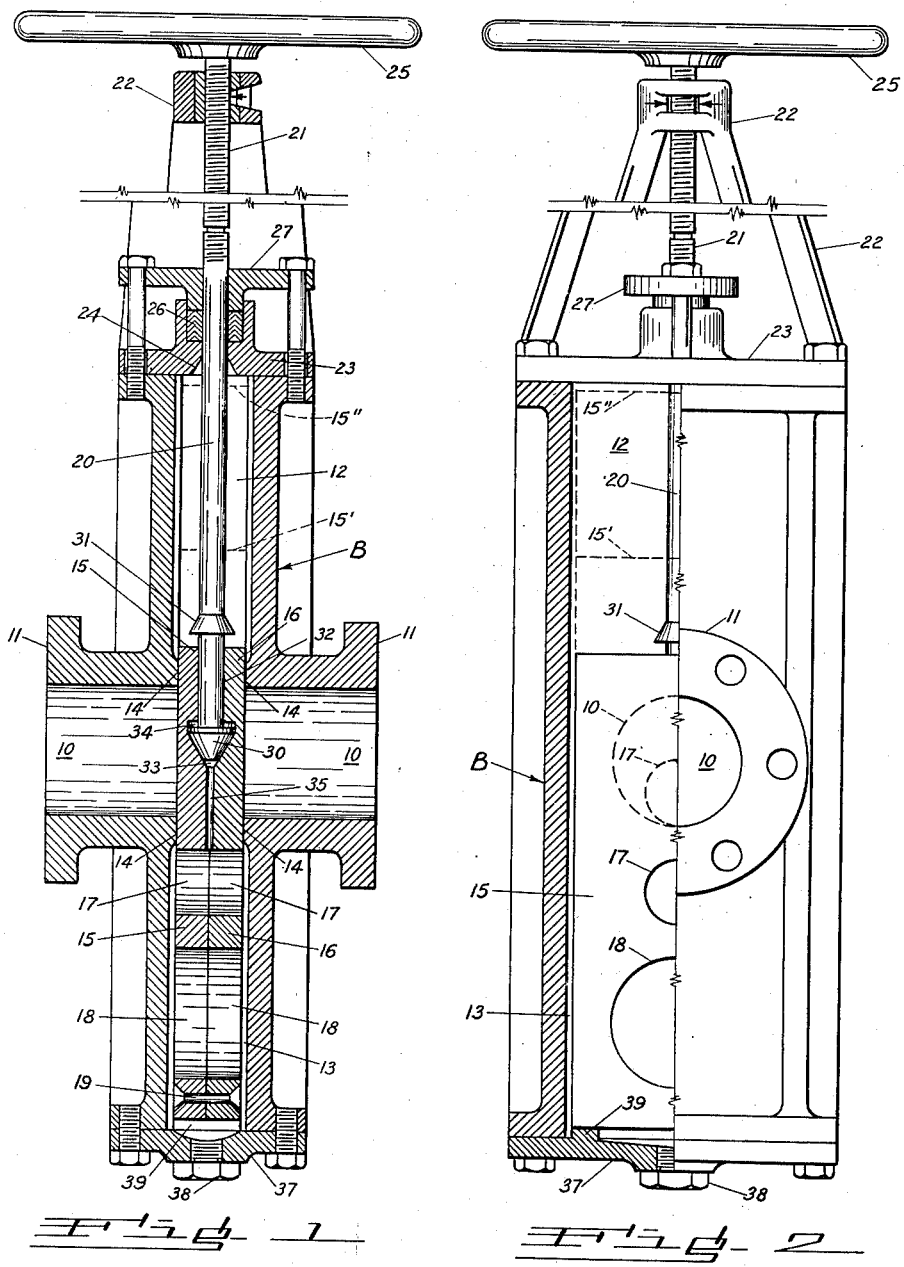

2,601,304

UNITED STATES PATENT OFFICE 2,601,304

GATE VALVE

George S. Lane, Cheyenne, Wyo.

Application September 3, 1946, Serial No. 694,569

10 Claims. (Cl. 251—68)

This invention relates to gate valves.

In the usual type of gate valve, the gate slides between seats and is moved by a valve stem to a desired position. A number of attempts have been made to provide in a gate valve some construction which will cause the gate to be forced tightly against the seats when the valve is in closed position. In general, such constructions have involved separate cranks or levers which must be turned to and from a tightening position each time the setting of the valve is changed, thus introducing objectionable complications in operation. Also, many liquids, such as water or crude oil, often carry foreign matter which tends to interfere with the proper setting of the valve and often is of an abrasive character, thereby tending to wear the valve seat unduly. In addition, liquids of a corrosive character, such as numerous chemicals, tend to cause destruction of the valve seat.

Among the objects of this invention are to provide an improved gate valve; to provide an improved gate valve in which the valve seat is protected from the action of abrasive material or corrosive liquids; to provide an improved gate valve in which the gate is separated into two parts; to provide an improved gate valve in which a wedging action against the gates is imparted thereto in closed position; to provide a gate valve in which no parts other than the gate and stem are required to provide such wedging action; to provide such a construction in which the gates are adequately maintained in position, yet permitted sufficient freedom of movement so as not to interfere with changes in setting; to provide such a construction in which adequate sealing is obtained in closed position without any tendency for the gates to jam or stick during movement from one position to another; and to provide such an improved gate valve which will be relatively simple in both construction and operation. Other objects and the novel features of this invention will become apparent from the description which follows.

In general, a gate valve to which the principles of this invention are applied may include a valve body having a fluid passage extending horizontally therethrough and a valve gate passage therein extending generally vertically and across the fluid passage, with valve seats formed on opposite sides of the valve passage and extending around the periphery of the fluid passage. In accordance with this invention, a pair of valve gates are disposed in side by side relation in the valve passage and are adapted to be pressed against the seats to form a seal therewith, while the valve gates and stem therefor are connected by means which produces a wedging action to press the gates against the seats when the valve is in closed position. The gate valve of this invention may include additional features, such as means fastening the gates together adjacent the bottom thereof, holes through the gates to provide half and full flow openings, and apertures formed in the gates providing a wedge-shaped circular slot which may be frustro-conical at the lower end and cylindrical at the upper end, and a corresponding wedge provided on the lower end of the valve stem. The preferred angle of the cone surface of the slot and wedge is 30°.

The novel gate valve of this invention may also include additional features, such as illustrated in the accompanying drawing, in which:

Fig. 1 is a vertical, longitudinal cross section of a gate valve constructed in accordance with this invention; and Fig. 2 is an end elevation, partly in cross section, of the gate valve of Fig. 1.

As illustrated in the drawing, the principles of this invention may be applied to a gate valve, illustrated in upright position and having a valve body B provided with a fluid passage 10 extending horizontally therethrough, from one attaching flange 11 to the other. Disposed centrally of the body B is a vertical valve passage having an upper section 12 and a lower section 13 and intersecting fluid passage 10 at valve seats 14 which extend around the periphery of fluid passage 10. Valve seats 14 project slightly inwardly, as shown, so that the upper and lower sections of the valve passage are enlarged, thus providing greater clearance for valve gates 15 and 16 above and below the seats 14. Gates 15 and 16 are similar but asymmetrical and are provided with aligned, intermediate holes 17 and lower holes 18, lower holes 18 being the same diameter as fluid passage 10, and intermediate holes 18 being proportioned to provide half flow, for instance. Gates 15 and 16 are also attached together at the lower ends by a bolt or rivet 19. A slight degree of freedom of movement is preferably provided at the upper ends of the gates, normally provided by the gates themselves. A valve stem 20 is utilized in raising and lowering the gates, threads 21 formed at the upper end of stem 20 cooperating with similar interior threads formed in a bracket 22 mounted atop a valve bonnet 23, the latter being provided with a socket 24. A hand wheel 25 is attached to the upper end of stem 20 for turning the stem, packing 26 being held in position by a gland 27 for sealing purposes.

In accordance with this invention, stem 20 extends between the gates 15 and 16 and is provided at its lower end with a wedge 30 which may be frustro-conical in shape with the surface elements thereof preferably inclined at an angle of 30° to the axis of stem 20. The stem is also provided with an oppositely inclined wedge or abutment 31 spaced above the gates for insuring a seal when the gates are moved to the uppermost position, as discussed later. Gates 15 and 16 are formed to provide a cylindrical hole 32 therebetween at the upper end thereof to receive the lower cylindrical portion of valve stem 20. Hole 32 may be machined or otherwise suitably formed, preferably half in each gate. In addition, suitable recesses are formed in the gates, as by machining, just beneath hole 32, to provide an aperture or slot which may have a frustro-conical lower portion 33, the surface elements of which are inclined at 30° to the axis of stem 20 the same as wedge 30, and a cylindrical upper portion 34, which also provides vertical clearance for wedge 30. A cylindrical hole 35 may also be formed in and between gates 15 and 16, and leads to intermediate holes 17 for drainage purposes, to prevent the collection of sand or the like about wedge 30.

The valve body B is provided with a lower cap 37 attached thereto and having a drain plug 38, for draining the lower section 13 of the valve passage so that material accumulating therein will not interfere with the proper operation of the valve. Also, a shoulder or abutment 39, formed integrally with cap 37 or attached thereto by welding or the like, extends upwardly, as at each end of the cap, to provide a stop to limit downward movement of the gates. Instead of providing a stop at the lower end of the gates, the lower portion of the lower section 13 of the valve passage may taper so that the gates tend to be joined together and close down on the wedge 30 as soon as the intermediate holes 17 move below the fluid passage 10, and further downward movement of the valve is accompanied by a spreading action of wedge 30. In any event, an effective and tight seal is obtained against the seats 14 when the valve plates 15 and 16 are in closed position.

In the closed position shown in Fig. 1, the gates 15 and 16 are pushed outwardly against valve seats 14 to provide a tight seal, due to the action of wedge 30 in frustro-conical portion 33. When the valve is to be opened, the first upward movement of stem 20 causes the wedge 30 to withdraw from the lower surfaces of the slot, which releases the pressure forcing gate 15 and 16 against seats 14. The upper end of the wedge 30 next intersects the flat at the upper end of cylindrical portion 34, and the stem begins to draw the gates 15 and 16 upwardly. To position the valve to provide half flow, the gates are lifted until intermediate holes 17 reach the dotted position of Fig. 2, gates 15 being in dotted position 15′. It will be understood of course, that the intermediate holes 17 may be proportioned for a different flow. When full flow is desired, gates 15 and 16 are lifted further upwardly until lower holes 18 coincide with the fluid passage 10, in which position gate 15 will have reached dotted position 15″. At this time, abutment 31 engages the corresponding socket 24 in bonnet 23, so that further upward travel of the valve gates will be prevented. It will be understood, of course, that "upper" and "lower," "horizontally" and "vertically," and the like, are used herein as relative words, referring to the valve in an upright position, but that the valve may in use be installed in any other desired position.

The clearances of the valve gates between the seats are preferably such that only a very slight movement is necessary for the valve gates to be wedged tightly against the seats, yet when the pressure exerted by wedge 30 is relieved, the valve gates can be moved readily upwardly or downwardly. As indicated previously, the preferred angle of the frustro-conical surface of the wedge 30, and the corresponding portion of the wedge chamber, is 30° with respect to the axis of the stem 20. An angle of 30° appears to be best suited for the construction shown, since if an angle greater than 30° is used, it will be too flat, and undue pressure will be required to wedge the gates tightly against the seats 14. If a smaller angle is used, there will be a tendency for the wedge to open the space between the gates, rather than push the gates down, when the valve is being closed. Attaching means at the bottom of the gates preferably clamps the gates together relatively tightly, since a spread of .015 in. to .020 in. is sufficient for the required freedom of movement of the tops of the gates and at the same time provide an effective seal in closed position. Also, the length of the gates is preferably such that this spread can be readily obtained at the upper ends of the gates, even though the lower ends are tightly clamped together. The valve seats 14 are protected from abrasion by abrasive particles carried by the liquid, and from the corrosion by a corrosive liquid. As will be evident, when the valve gates are moved to a position in which the intermediate holes 17 are in the dotted position of Fig. 2 or slightly thereabove, and also when the lower holes 18 are in register with the passage 10, the gates prevent abrasive particles or corrosive liquid from flowing over the seats 14. When the liquid contains abrasive particles or a corrosive liquid is being handled, the valve of this invention is preferably set so as to provide full flow or half flow, or whatever other flow holes 17 are designed for.

From the foregoing, it will be apparent that the gate valve of this invention fulfills to a marked degree the requirements and objects hereinbefore set forth. The moving parts are relatively simple, and the weight thereof is kept to a minimum. Also, there is only one exterior operating lever, i. e., the hand wheel 25. The provision of cooperating means formed by the stem and plates not only reduces the longitudinal thickness of the valve but also reduces the weight of metal required and the size of the valve passage. While the angle of 30° for the frustro-conical surface of the wedge may be changed somewhat, if desired, to a greater divergence from the preferred angle of 30°, too great a divergence may result in difficulty, for reasons given above.

The valve of this invention may be constructed in any suitable manner, preferably by casting or by forging the various parts, although some of the parts may be built up, as by welding.

Although a specific embodiment of this invention has been illustrated and described, it will be evident that other embodiments may exist, and that various changes may be made therein, all without departing from the spirit and scope of this invention.

What I claim and desire to secure by Letters Patent is:

1. A valve comprising a body having a fluid passage extending horizontally therethrough and a valve gate passage therein extending generally vertically and across said fluid passage; valve seats on opposite sides of said valve passage and extending around the periphery of said fluid passage; a pair of valve gates disposed in side by side relation in said valve passage and adapted to be pressed against said seats to form a seal therewith; means attaching said gates together at the lower end thereof; a valve stem extending in said valve passage; and rivet means spaced above the lower edges of the gates for connecting said stem and said gates for wedging said gates against said seats when said stem is moved to its lowermost position and for relieving the wedging action of said gates and moving said gates to a fluid flow position when said stem is moved upwardly.

2. A valve comprising a body having a fluid passage extending horizontally therethrough and a valve gate passage therein extending generally vertically and across said fluid passage; valve seats on opposite sides of said valve passage and extending around the periphery of said fluid passage; a pair of valve gates disposed in side by side relation in said valve passage and adapted to be pressed against said seats to form a seal therewith each said gate being provided with two fluid flow holes of different diameters, the lower fluid flow holes being substantially the same diameter as said fluid passages and the upper fluid flow holes being smaller, each said gate being provided with a cooperating interior aperture having a flat surface at the upper end and a wedge-shaped surface at the lower end; a valve stem extending in said valve passage and between said gates, said stem having at its lower end a wedge corresponding in shape to said aperture; and means attaching the lower ends of said gates together.

3. A valve comprising a body having a fluid passage extending horizontally therethrough and a valve gate passage therein extending generally vertically and across said fluid passage; valve seats on opposite sides of said valve passage and extending around the periphery of said fluid passage; a pair of valve gates disposed in side by side relation in said valve passage and adapted to be pressed against said seats to form a seal therewith, the lower portion of said gates being provided with fluid flow passages of different sizes, and the upper portion of said gates being provided with cooperating interior apertures having a flat surface at the upper end and frusto-conical surface at the lower end a drain passage from said frusto-conical portion to one of said fluid flow passages; a valve stem extending in said valve passage and between gates, said stem having a wedge at its lower end corresponding in shape to said apertures; and means attaching the lower ends of said gates together.

4. A valve comprising a body having a fluid passage extending horizontally therethrough and a valve gate passage therein extending generally vertically and across said fluid passage; valve seats on opposite sides of said valve passage and extending around the periphery of said fluid passage; a pair of valve gates disposed in side by side relation in said valve passage and adapted to be pressed against said seats to form a seal therewith, said gates being provided with aligned fluid flow holes spaced below said valve fluid passage in closer position and also provided with cooperating interior apertures having a flat surface at the upper end and a tapered surface at the lower end, said gates further provided with a drain opening therebetween from said apertures to one of said fluid flow holes; a valve stem extending in said valve passage between said aperture, said stem having a wedge at its lower end corresponding in shape to said apertures; means attaching the lower ends of said gates together; and a stop disposed at the lower end of said body for limiting downward movement of said gates.

5. A valve comprising a body having a fluid passage extending horizontally therethrough and a valve gate passage therein extending generally vertically and across said fluid passage; valve seats on opposite sides of said valve passage and extending around the periphery of said fluid passage; said fluid passage having enlarged portions above and below said valve seats; a pair of gates disposed in side by side relation in said valve passage and adapted to be pressed against said seats to form a seal therewith, each said gate being substantially rectangular in shape provided with fluid flow passages and also with cooperating interior apertures having a flat surface at the upper end and a tapered surface at the lower end; a valve stem extending in said valve passage and between said gates, said stem having a wedge at its lower end corresponding in shape to said apertures; and means attaching the lower ends of said gates together.

6. A valve comprising a body having a fluid passage extending horizontally therethrough and a valve gate passage therein extending generally vertically and across said fluid passage; valve seats on opposite sides of said valve passage and extending around the periphery of said fluid passage; a pair of valve gates disposed in side by side relation in said valve passage and adapted to be pressed against said seats to form a seal therewith, each said gate being provided with fluid flow holes of different diameters and also with cooperating interior apertures having a flat surface at the upper end and a frustro-conical portion at the lower end, said valve gates also being provided with a drain passage from said frustro-conical portion to one of said fluid flow holes; a valve stem extending in said valve passage and between said gates, said stem having a wedge at the lower end corresponding in shape to said apertures; and means attaching the lower ends of said gates together.

7. A valve comprising a body having a fluid passage extending horizontally therethrough and a valve gate passage therein extending generally vertically and across said fluid passage; valve seats on opposite sides of said valve passage and extending around the periphery of said fluid passage; a pair of valve gates disposed in side by side relation in said valve passage and adapted to be pressed against said seats to form a seal therewith, each said gate being substantially rectangular in shape and in their lower portions provided with two fluid flow holes of different diameters, the lower fluid flow holes being substantially the same diameter as said fluid passages and the upper fluid flow holes being smaller, said gates also being provided at their upper ends with an interior cylindrical recess adapted to receive a valve stem and leading to cooperating interior apertures having a cylindrical portion at the upper end and a frusto-conical portion at the lower end, said valve gates also being provided with a drain passage from said frustro-conical portion to the upper of said fluid flow holes; a valve stem extending in said valve passage and between said gates, said stem having a wedge at the lower end corresponding in shape to said apertures; and means beneath the lower fluid flow hole attaching the lower ends of said gates together.

8. A valve comprising a body having a fluid passage extending horizontally therethrough and a valve gate passage therein extending generally vertically and across said fluid passage; valve seats on opposite sides of said valve passage and extending around the periphery of said fluid passage, said valve gate passage being enlarged above and below said valve seats; a bonnet having a tapered recess closing the upper end of said gate passage; a removable cap having a removable drain plug closing the lower end of said gate passage; a pair of valve gates disposed in side by side relation in said valve passage and adapted to be pressed against said seats to form a seal therewith each said gate being substantially rectangular in shape and provided with fluid flow holes of different diameter, said cap providing a stop to limit downward movement of said gates; a valve stem extending through said bonnet into said valve passage and between said gates, said stem having a wedge above said gates for engaging said tapered recess in said bonnet; and rivet means extending through the gates above their lower ends for connecting said stem and said gates together.

9. A valve comprising a body having a fluid passage extending horizontally therethrough and a valve gate passage therein extending generally vertically and across said fluid passage; valve seats on opposite sides of said valve passage and extending around the periphery of said fluid passage; a pair of valve gates disposed in side by side relation in said valve passage and adapted to be pressed against said seats to form a seal therewith each said gate being substantially rectangular in shape and in their lower portions provided with two fluid flow holes of different diameters, the lower fluid flow holes being substantially the same diameter as said fluid passages and the upper fluid flow holes being smaller; means attaching said gates together at the lower end thereof; a valve stem extending in said valve passage; and means connecting said stem and said gates for wedging said gates against said seats when said stem is moved downwardly and for relieving the wedging action of said gates and moving said gates to a fluid flow position when said stem is moved upwardly.

10. A valve comprising a body having a fluid passage extending horizontally therethrough and a valve gate passage therein extending generally vertically and across said fluid passage; valve seats on opposite sides of said valve passage and extending around the periphery of said fluid passage; a pair of valve gates disposed in side by side relation in said valve passage and adapted to be pressed against said seats to form a seal therewith, each said gate being substantially rectangular in shape and in their lower portions provided with two fluid flow holes of different diameters, the lower fluid flow holes being substantially the same diameter as said fluid passages and the upper fluid flow holes being smaller; a valve stem extending in said valve passage; and means connecting said stem and said gates for wedging said gates against said seats when said stem is moved downwardly and for relieving the wedging action of said gates and moving said gates to a fluid flow position when said stem is moved upwardly.

GEORGE S. LANE.

REFERENCES CITED

The following references are of record in the file of this patent:

UNITED STATES PATENTS

| Number | Name | Date |
|---|---|---|
| 99,944 | Peet | Feb. 15, 1870 |
| 575,848 | O'Brien | Jan. 26, 1897 |
| 685,438 | Warburton | Oct. 29, 1901 |
| 1,624,465 | Black | Apr. 12, 1927 |
| 1,636,427 | Morrison | July 19, 1927 |
| 1,869,741 | Du Bois | Aug. 2, 1932 |
| 1,921,298 | Lewis | Aug. 8, 1933 |
| 2,192,331 | Schaefer | Mar. 5, 1940 |
| 2,282,553 | Banowetz | May 12, 1942 |
| 2,287,435 | Koon | June 23, 1942 |
| 2,306,490 | Noble | Dec. 29, 1942 |

FOREIGN PATENTS

| Number | Country | Date |
|---|---|---|
| 868,316 | France | 1941 |